April 6, 1937.   J. F. DEVLIN   2,076,447
QUITCH GRASS KILLER
Filed Oct. 27, 1936
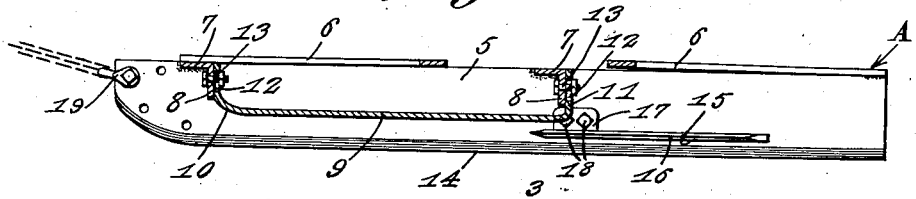
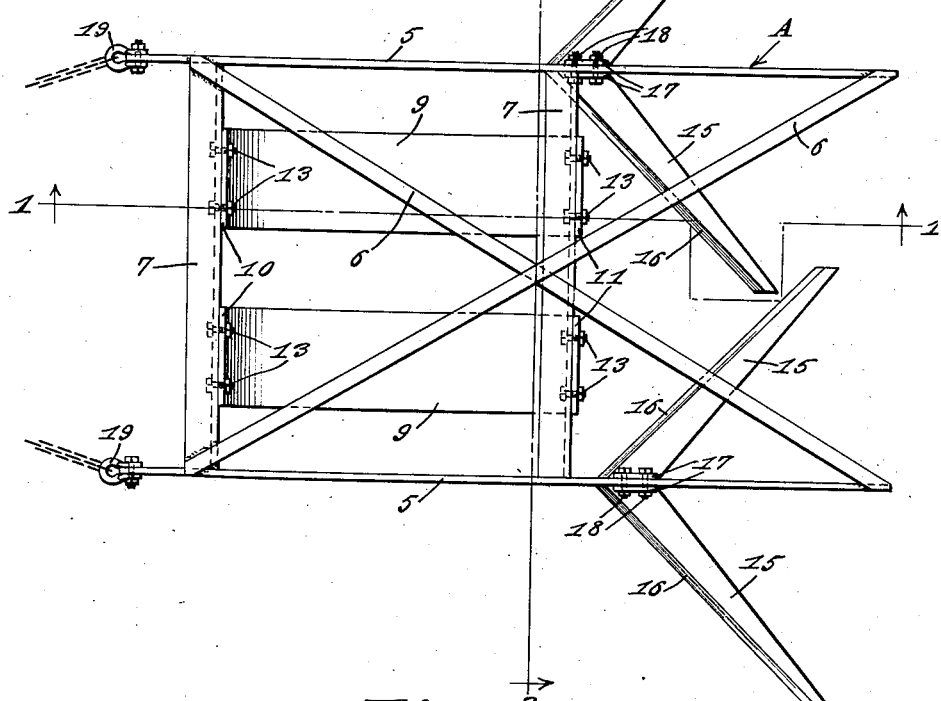
James F. Devlin, INVENTOR
BY Victor J. Evans & Co.
ATTORNEYS Patented Apr. 6, 1937

2,076,447

UNITED STATES PATENT OFFICE 2,076,447

QUITCH GRASS KILLER

James F. Devlin, Marinette, Wis.

Application October 27, 1936, Serial No. 107,870

1 Claim. (Cl. 55—60)

The invention relates to a quitch grass exterminator or killer.

The primary object of the invention is the provision of an implement of this character, wherein the same carries a series of knives, these being disposed in a manner to cut beneath the ground surface for the killing of quitch grass when the implement is drawn and advanced over the ground, there being means provided to prevent the implement from sinking too deep into the ground and assuring the riding of such implement over irregularities in the ground surface to avoid obstruction in the advancement of such implement.

Another object of the invention is the provision of an implement of this character, wherein the cutting action of the knives is effected at opposite sides of guides and a cutting operation is had next to such guides and a considerable distance beyond inner and outer sides thereof.

A further object of the invention is the provision of an implement of this character, which is simple in its construction, thoroughly reliable and effective in its operation, readily and easily advanced over a ground surface, assured of positive cutting action for the killing of quitch grass, strong, durable, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is a sectional view on the line 1—1 of Figure 2 looking in the direction of the arrows.

Figure 2 is a top plan view of the implement constructed in accordance with the invention.

Figure 3 is a sectional view on the line 3—3 of Figure 2 looking in the direction of the arrows.

Similar reference characters indicate corresponding parts throughout the several views in the drawing.

Referring to the drawing in detail, A designates generally the implement constructed in accordance with the invention and involves spaced parallel guides 5 which are held in their spaced parallel relation through the medium of crossed braces or strips 6 joined with the said guides in any suitable manner. Arranged close to the front ends of the guides 5 and intermediate of the ends of the same are angle bars 7 which are disposed to lie flush with the top edges of said guides and present depending flanges 8 between the guides.

Located between the guides 5 are relatively wide spaced parallel shoes 9, these being longitudinally disposed and formed with slightly rounded upturned forward ends 10 and upturned rear ends 11 at right angles thereto, respectively. These ends 10 and 11 are provided with slots 12 accommodating bolts 13 fixed in the flanges 8. Thus the shoes 9 can be vertically adjusted to regulate the plane thereof with respect to the bottom knife edges 14 of the guides 5. The purpose of the shoes 9 is to prevent the guides from sinking too deep into the soil or ground surface when the implement is advanced thereover and also such shoes function as runners and lift the implement over irregularities in the ground surface during the travel thereof.

Arranged at opposite sides of the guides 5 next to the rear ends 11 of the shoes 9 are forwardly convergent outwardly tapered cutting blades 15, these being arranged horizontally in a plane common to each other and have the front knife edges 16 which extend from the guides 5 to the outer free ends of said blades. The blades 15 are made secure to the guides by brackets 17 bolted at 18 thereto and these blades in their disposition will cut quitch grass for the killing of the latter, the blades being slightly beneath the ground surface when in cutting operation.

The blades 15 are of uniform length with respect to each other and those blades between the guides 5 are disposed so that the free ends extend in overlapping relation to each other or beyond one another to avoid any gap medially between the guides and thereby cutting completely any quitch grass in this path or standing at the longitudinal median of the implement. The extent of the blades 15 assures a relatively wide cutting sweep in the advancement of the implement.

Swingingly connected to the forward ends of the guides are hitch members 19 for the draft of the implement.

The implement in the operation thereof is drawn forwardly, the guides being slightly penetrated in the ground, the penetration being regulated by the shoes and the blades will cut quitch grass during advancement of the implement, while the shoes 9 function as runners and cause the implement to ride over irregularities in the ground, avoiding too deep sinking of the guides therein.

What is claimed is:—

An implement of the character described comprising spaced parallel guides, angle pieces joined with the guides and between the same, relatively wide flat shoes arranged between the guides and adjustably connected with said angle pieces, forwardly convergent horizontally arranged cutting blades carried by and extended laterally from opposite sides of said guides, the said blades being arranged in the same plane with each other and at the rear of the shoes, and braces connected with the guides and arranged at the top edges thereof to be disposed between the same.

JAMES F. DEVLIN.